United States Patent
Zomorodi Moghadam et al.

(10) Patent No.: US 12,504,919 B2
(45) Date of Patent: Dec. 23, 2025

(54) UPDATES IN AN ELECTRONICALLY ERASABLE PROGRAMMABLE READ-ONLY MEMORY (EEPROM)

(71) Applicant: Ford Global Technologies, LLC, Dearborn, MI (US)

(72) Inventors: Hesam Zomorodi Moghadam, Ypsilanti, MI (US); Gabriel Maguire, Ferndale, MI (US); Subramaniam Palaniappan, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 18/609,002

(22) Filed: Mar. 19, 2024

(65) Prior Publication Data
US 2025/0298536 A1    Sep. 25, 2025

(51) Int. Cl.
*G06F 3/06* (2006.01)
*G06F 8/65* (2018.01)

(52) U.S. Cl.
CPC .......... *G06F 3/0655* (2013.01); *G06F 3/0604* (2013.01); *G06F 3/0679* (2013.01); *G06F 8/65* (2013.01)

(58) Field of Classification Search
CPC ................................ G06F 3/0604; G06F 8/65
See application file for complete search history.

(56) References Cited

U.S. PATENT DOCUMENTS

| | | | |
|---|---|---|---|
| 5,210,854 A | 5/1993 | Beaverton et al. | |
| 2018/0275886 A1* | 9/2018 | Zhang | G06F 3/0608 |
| 2020/0326930 A1* | 10/2020 | Suryanarayana | G06F 8/65 |
| 2021/0117176 A1* | 4/2021 | Watt | G06F 8/71 |
| 2021/0318830 A1* | 10/2021 | Jones | G06F 3/0644 |

FOREIGN PATENT DOCUMENTS

| | | | |
|---|---|---|---|
| CN | 111241008 A | 6/2020 | |
| CN | 116126229 A | 5/2023 | |

OTHER PUBLICATIONS

Protobuf Overview, https://protobuf.dev/overview/.
Protobuf Programming Guides, Proto 2, https://protobuf.dev/programming-guides/proto2/.
Protobuf Programming Guides, Proto 3, https://protobuf.dev/programming-guides/proto3/.
Protobuf Editions Overview, https://protobuf.dev/editions/overview/.

* cited by examiner

*Primary Examiner* — Nicholas A. Paperno
(74) *Attorney, Agent, or Firm* — Christopher Storms; Brooks Kushman P.C.

(57) ABSTRACT

A computer may store records at respective locations in the memory. The records may respectively include, for one of a plurality of variables, an identifier and a size. Responsive to a notification of a software update, the computer may retrieve from the memory a first map of the variables specifying their respective locations in the memory and respective sizes for each of the variables along with the identifiers. The computer may receive, from a remote device, a second map of the variables specifying respective second locations in the memory, and second sizes, for the respective variables along with the identifiers. The computer may store the variables to the respective second locations in memory and store the second map in place of the first map.

18 Claims, 7 Drawing Sheets

FIG. 3

Version 1 (140)

| Address | Identifier | Name |
|---|---|---|
| 0x00 | 0x0001[0] | a[0] |
| 0x01 | 0x0001[1] | a[1] |
| 0x02 | 0x0000[0] | b[0] |
| 0x03 | 0x0000[1] | b[1] |
| 0x04 | 0x0000[2] | b[2] |
| 0x05 | 0x0000[3] | b[3] |
| 0x06 | 0x00F1 | d |
| 0x07 | 0x00F0 | c |

Version 2 (142)

| Address | Identifier | variable |
|---|---|---|
| 0x00 | 0x0000[0] | b[0] |
| 0x01 | 0x0000[1] | b[1] |
| 0x02 | 0x0000[2] | b[2] |
| 0x03 | 0x0000[3] | b[3] |
| 0x04 | 0x0001[0] | a[0] |
| 0x05 | 0x0001[1] | a[1] |
| 0x06 | 0x00F0 | c |
| 0x07 | 0x0015[0] | e[0] |
| 0x08 | 0x0015[1] | e[1] |

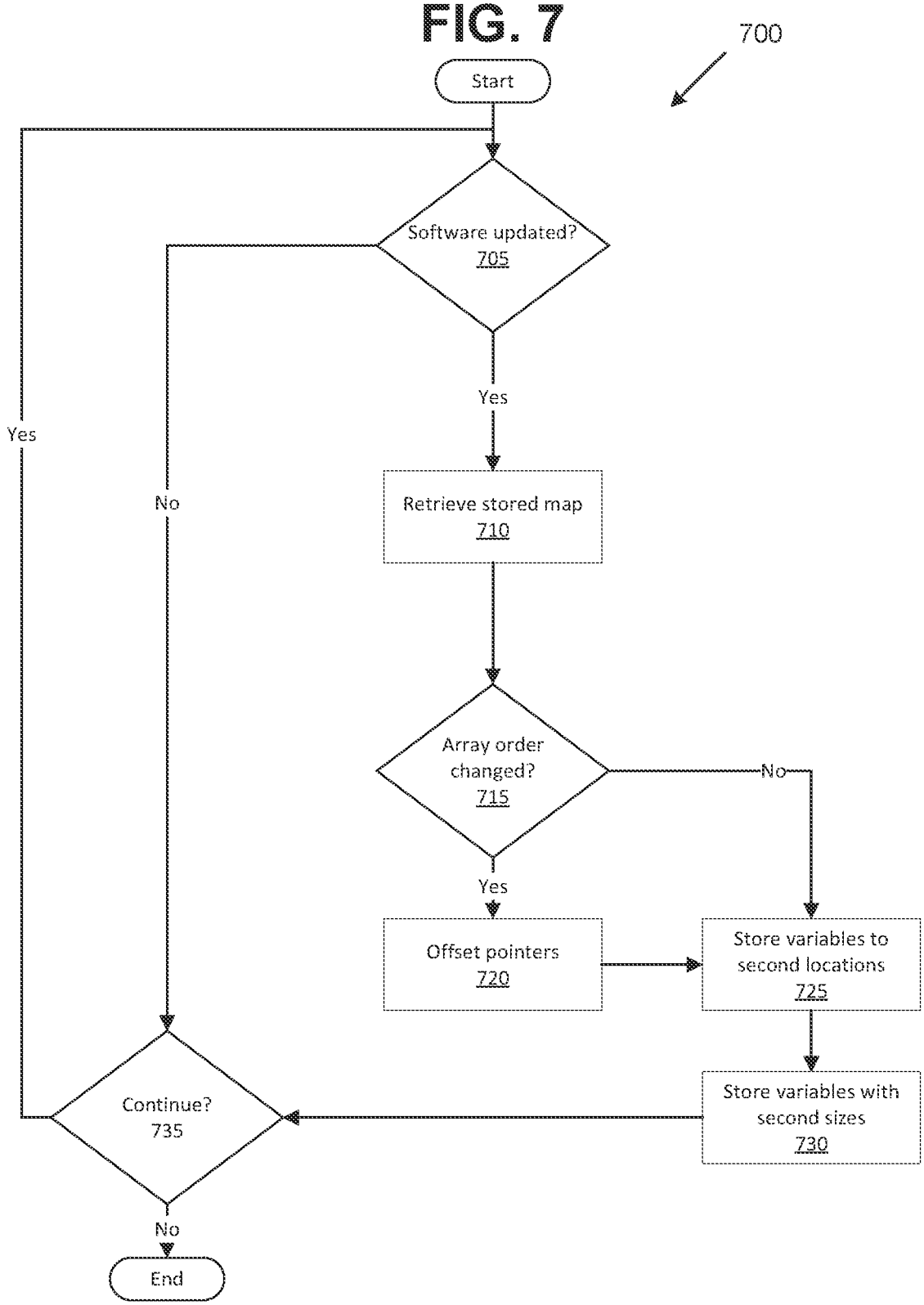

UPDATES IN AN ELECTRONICALLY ERASABLE PROGRAMMABLE READ-ONLY MEMORY (EEPROM)

BACKGROUND

Data can be stored in an electronically erasable programmable read-only memory (EEPROM). The data may represent values of variables. The EEPROM may be updated to add, delete, and/or modify data. During updates, values and/or addresses of the data may change.

BRIEF DESCRIPTION OF THE DRAWINGS

FIG. 3 illustrates example variable lists.
FIG. 7 is a process flow diagram illustrating an example process for updating data.

DETAILED DESCRIPTION

Introduction

Figure 1:
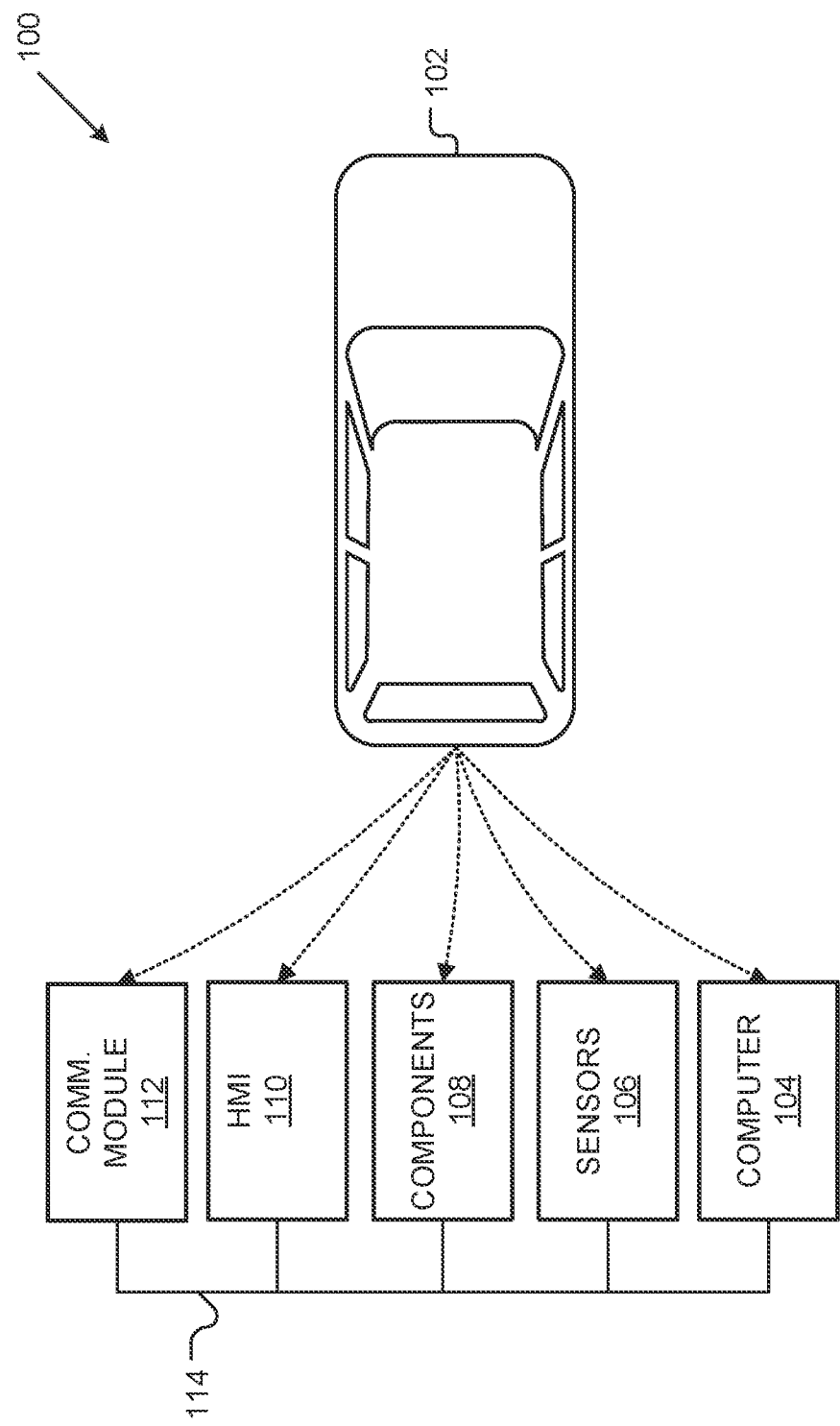
FIG. 1 is a block diagram of an example vehicle.

Described herein are techniques for managing an electronically erasable programmable read-only memory (EEPROM). A variable may have an identifier and a size and a datum or data representing the variable can be stored in a location in memory. Variables stored in the EEPROM can be updated. Addresses, sizes, and/or values of variables may change during an update, and/or variables can be added or removed. Techniques disclosed herein can provide for operating an application following an update to the EEPROM that modifies, adds, and/or removes variables.

Accordingly, included in the present disclosure is a system comprising a processor and a memory, the processor being programmed to: store records at respective locations in the memory, the records respectively including, for one of a plurality of variables, an identifier and a size; responsive to a notification of a software update, retrieve from the memory a first map of the variables specifying their respective locations in the memory and respective sizes for each of the variables along with the identifiers; receive from a remote device a second map of the variables specifying respective second locations in the memory, and second sizes, for the respective variables along with the identifiers; store the variables to the respective second locations in memory; and store the second map in place of the first map.

Addresses to the respective locations in the memory may be identified.

At least one of the addresses may be determined by determining an offset from a memory location of another one of the addresses.

At least one of the second locations may be the same as one of the first locations.

At least one of the second sizes may be the same as one of the first sizes.

For each of a plurality of sizes, a count of the variables of the respective size, and a starting memory address for the size may be identified.

The size of the plurality of variables may be determined based on a comparison of the respective one variable's relative location in memory to compressed map.

The respective locations in the memory may be organized by an order in which the variables were stored in memory.

The respective locations in the memory may be organized by the respective sizes.

The plurality of variables may be stored in the remote device.

A method comprises: storing records at respective locations in the memory, the records respectively including, for one of a plurality of variables, an identifier and a size; responsive to a notification of a software update, retrieving from the memory a first map of the variables specifying their respective locations in the memory and respective sizes for each of the variables along with the identifiers; receiving from a remote device a second map of the variables specifying respective second locations in the memory, and second sizes, for the respective variables along with the identifiers; storing the variables to the respective second locations in memory; and storing the second map in place of the first map.

Addresses to the respective locations in the memory may be identified.

At least one of the addresses may be determined by determining an offset from a memory location of another one of the addresses.

At least one of the second locations may be the same as one of the first locations.

At least one of the second sizes may be the same as one of the first sizes.

For each of a plurality of sizes, a count of the variables of the respective size, and a starting memory address for the size may be identified.

The size of the plurality of variables may be determined based on a comparison of the respective one variable's relative location in memory to compressed map.

The respective locations in the memory may be organized by an order in which the variables were stored in memory.

The respective locations in the memory may be organized by the respective sizes.

The plurality of variables may be stored in the remote device.

Exemplary System Elements

FIG. 1 is a block diagram of a vehicle system 100 utilizing EEPROM. The vehicle 102 includes a computer 104 having a memory 118 that includes instructions executable by the computer 104 to carry out processes and operations including as described herein. The computer 104 may be communicatively coupled via a communication network, such as a vehicle network 114, with sensors 106, components 108, a human machine interface (HMI) 110 and a communication module 112 in the vehicle 102. The vehicle 102 may be any passenger or commercial automobile such as a car, a truck, a sport utility vehicle, a crossover, a van, a minivan, a taxi, a bus, etc.

The computer 104 includes a processor 116 and a memory 118. The memory 118 includes one or more forms of computer readable media, and stores instructions executable by the processor 116 for performing various operations, including as disclosed herein. For example, a computer 104 can be a generic computer with a processor 116 and memory 118 as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, a computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components 108 inside an FPGA may be configured based on VHDL programming, e.g. stored in a memory 118 electrically connected to the FPGA circuit. In some examples, a combination of processor(s) 116, ASIC(s), and/or FPGA circuits may be included in a computer 104.

The memory 118 includes EEPROM and typically includes other types of memory. Other types of memory may be hard disk drives, solid state drives, servers, or any volatile or non-volatile media. The memory 118 can be a separate device from the computer 104, and the computer 104 can retrieve information stored by the memory 118 via a network in the vehicle 102, e.g., over a CAN bus, a wireless network, etc. Alternatively or additionally, the memory 118 can be part of the computer 104, e.g., as a memory of the computer 104.

The computer 104 may include or be communicatively coupled to, e.g., via a vehicle network 114 such as a communications bus as described further below, more than one processor 116, e.g., included in components 108 such as sensors 106, electronic control units (ECUs) or the like included in the vehicle 102 for monitoring and/or controlling various vehicle components 108, e.g., a powertrain controller, a brake controller, a steering controller, etc. The computer 104 is generally arranged for communications on a vehicle communication network that can include a bus in the vehicle 102 such as a controller area network CAN or the like, and/or other wired and/or wireless mechanisms. Alternatively or additionally, in cases where the computer 104 actually comprises a plurality of devices, the vehicle communication network may be used for communications between devices represented as the computer 104 in this disclosure. Further, as mentioned below, various controllers and/or sensors 106 may provide data to the computer 104 via the vehicle communication network.

Via the vehicle network 114, the computer 104 may transmit messages to various devices in the host vehicle and/or receive messages (e.g., CAN messages) from the various devices, e.g., sensors 106, ECUs, etc. Alternatively, or additionally, in cases where the computer 104 actually comprises a plurality of devices, the vehicle communication network may be used for communications between devices represented as the computer 104 in this disclosure. Further, as mentioned below, various controllers and/or sensors 106 may provide data to the computer 104 via the vehicle communication network.

Figure 2:
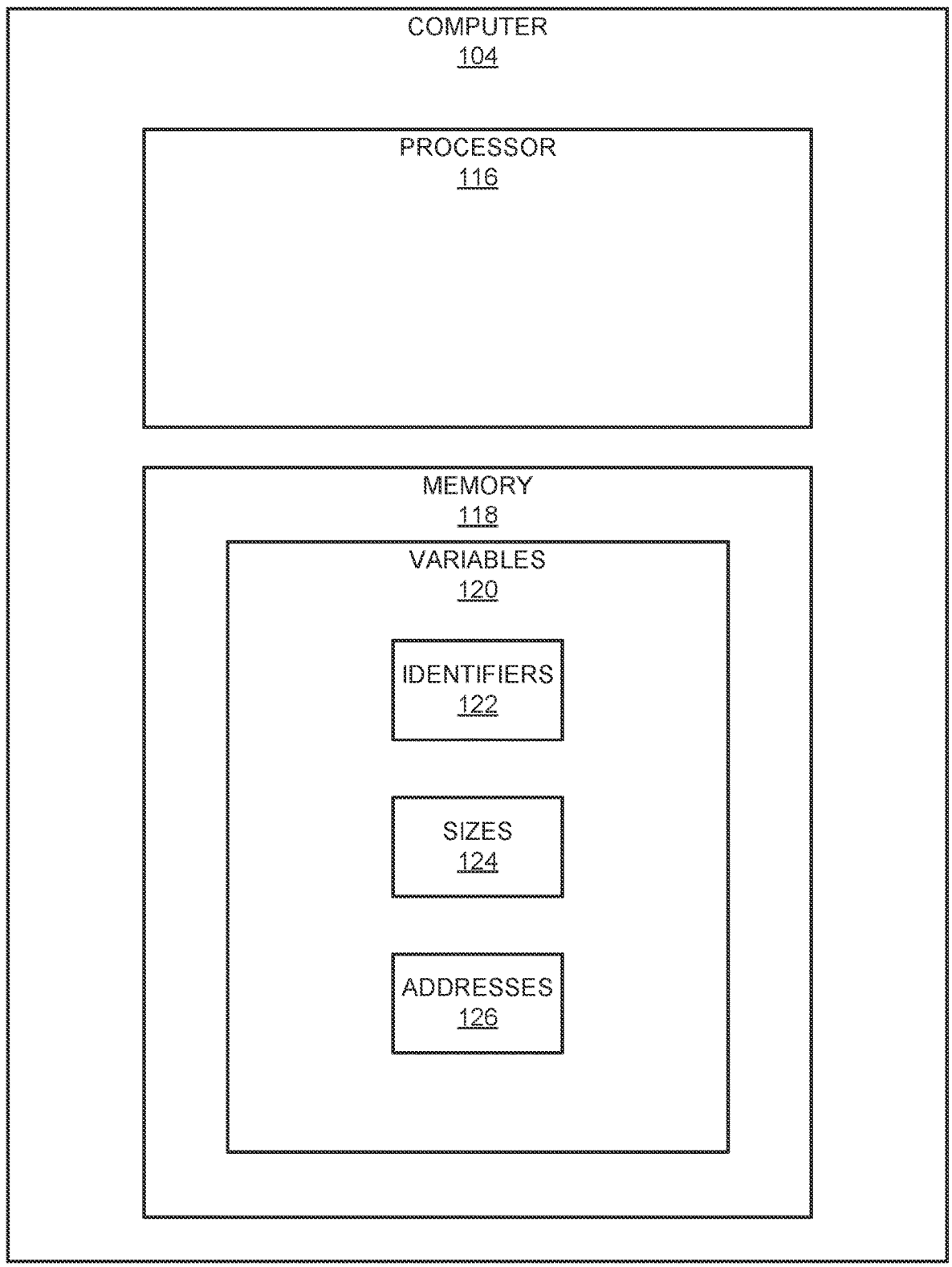
FIG. 2 is a block diagram of an example vehicle computer.

FIG. 2 illustrates an example computer 104. As described above the computer 104 has a processor 116 and a memory 118. The memory 118 includes one or more forms of computer readable media, and stores instructions executable by the computer 104 for performing various operations. The computer 104 includes an EEPROM and may have one or more other types of memory.

The computer 104 can be programmed to store records at respective locations in the memory 118, the records respectively including, for one of a plurality of variables 120, an identifier 122 and a size 124. That is, the memory 118 may store data representing variables 120 including an identifier 122 and a size 124 of a variable 120, as well as a value. As used herein, a "record" refers to a set of data that includes a variable's identifier 122 and size 124 (i.e., number of bits or bytes used to store the variable 120 in memory 118). The memory 118 may store any number of records desirable to be used in any software application. The records may be accessed by software applications by use of pointers to or addresses 126 of a location or locations in memory 118 at which a record, or a beginning or a record, is stored.

The identifier 122 for a variable 120 is a (typically unique or substantially unique) value assigned to a variable 120 to allow the variable 120 to be accessed. A variable 120, as described above, can be stored at an address 126 in memory 118. to the processor 116 can access the variable 120 based on the address 126, e.g., by invoking a pointer to the address 126. That is, the processor 116 can specify a stored memory location to access a stored variable 120, e.g., to retrieve a current value of, i.e., data representing, the variable 120, change or update a value of the variable 120, etc.

A size 124 of a variable 120 means a length or number of bytes to store variable data. That is, if the variable data is 1101110100110101, the size 124 of a variable 120 would be 16 bytes. The variable 120 could be accessed by reading at a location in memory 118 specified by an address 126 and reads 16 bytes from that address 126 and possibly also successive contiguous memory addresses 126. A change to the size 124 of the variable 120 changes the number of bytes to store the variable 120 (and which are read when the variable 120 is retrieved from memory 118).

Figure 4:
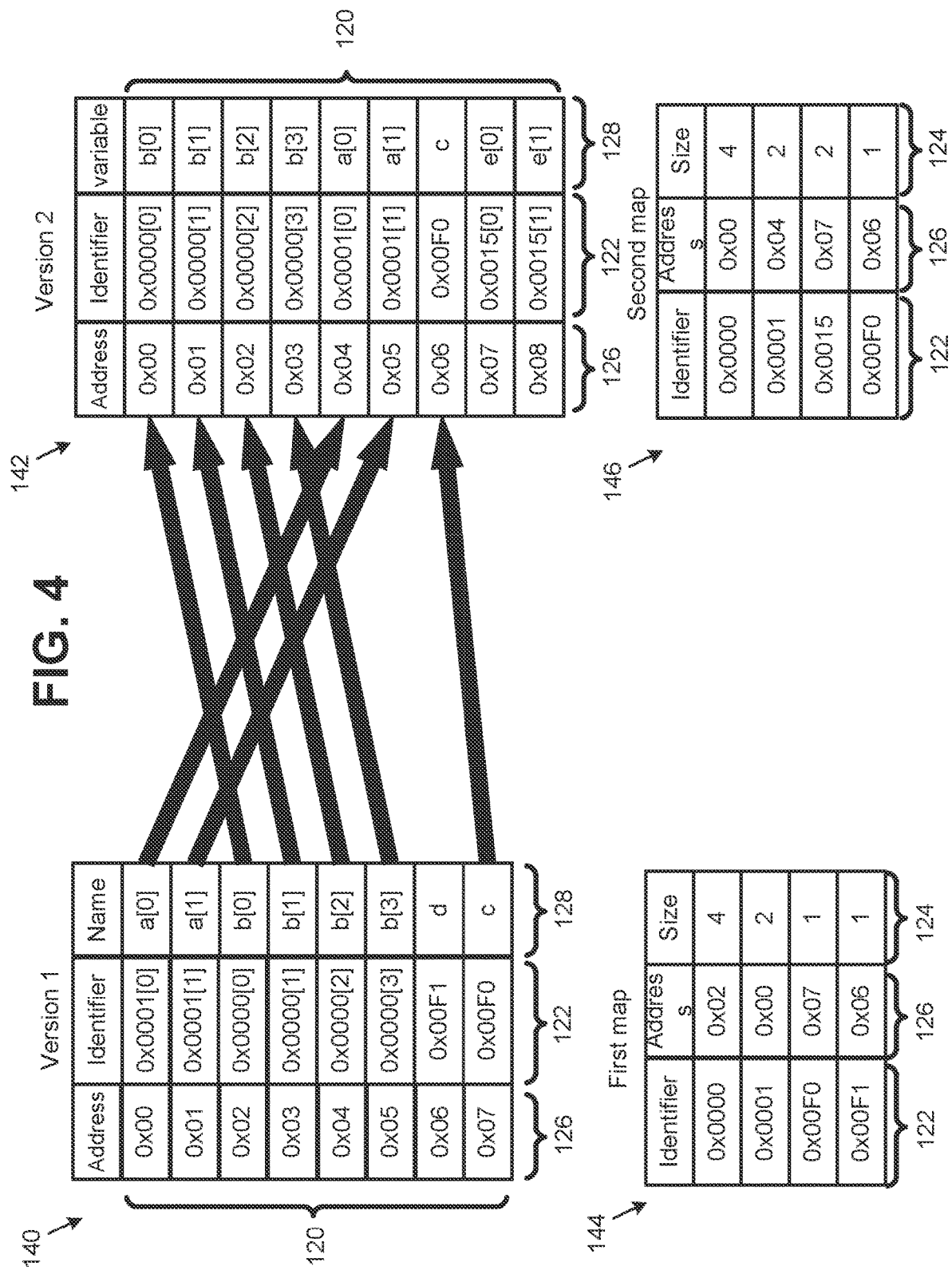
FIG. 4 illustrates example variable maps.
Figure 5:
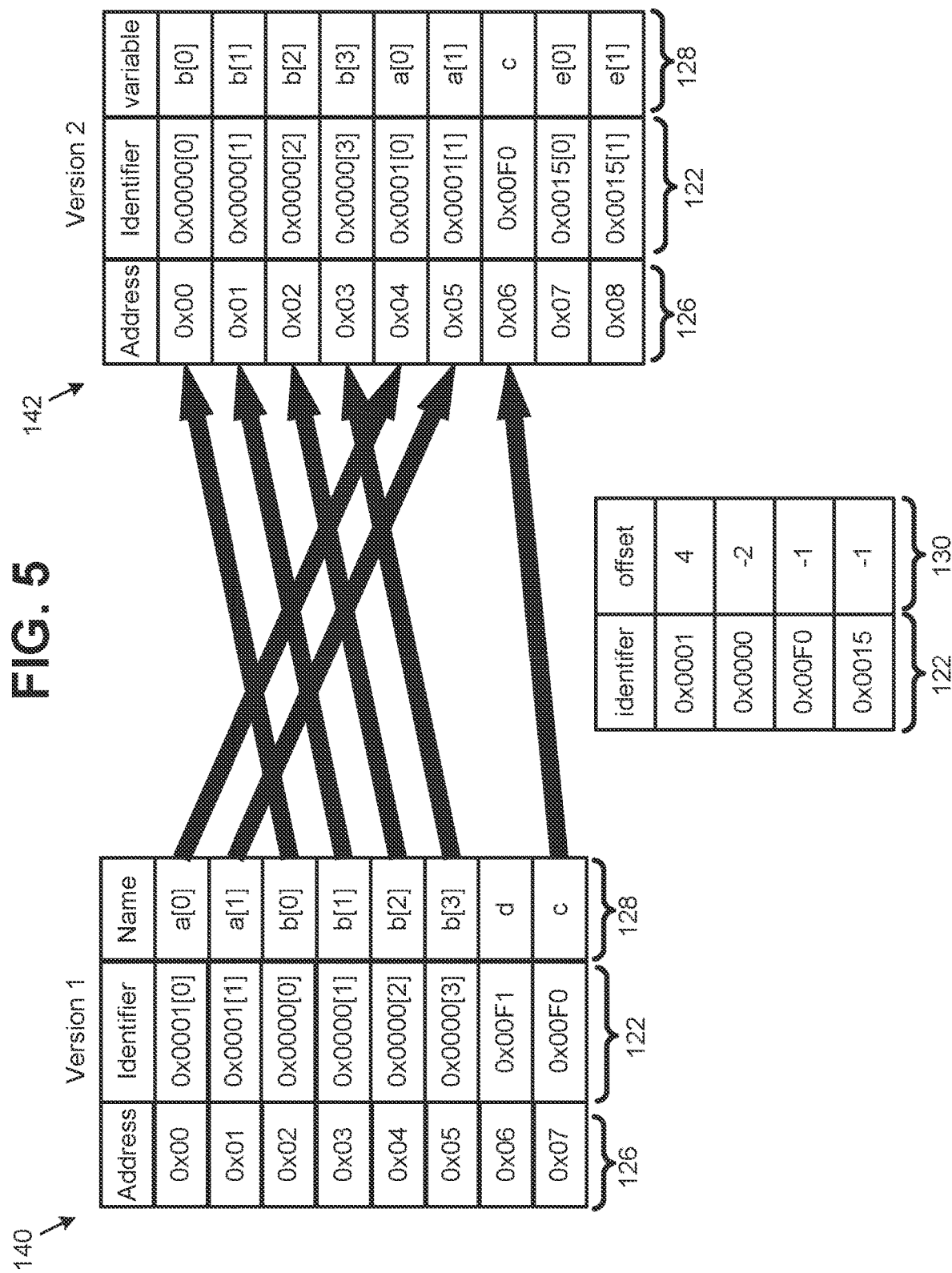
FIG. 5 illustrates an example of variable offset.
Figure 6:
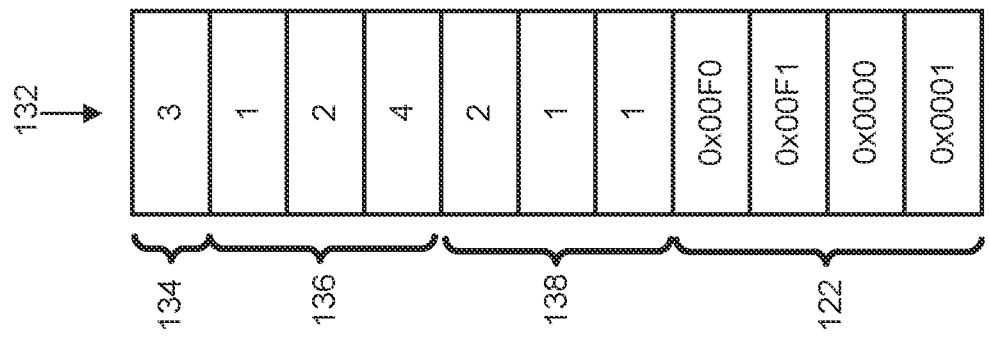
FIG. 6 illustrates an example compressed map.
Figure 6:
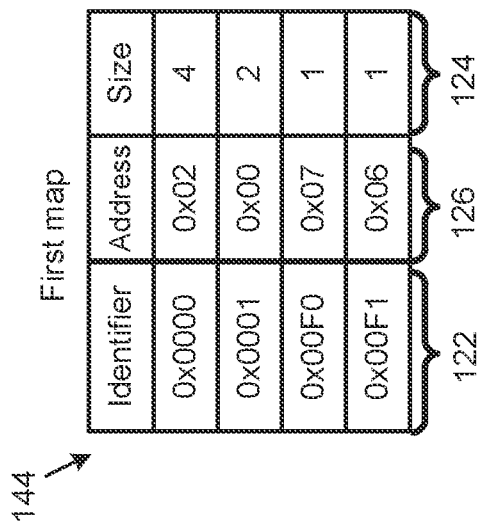

A variable 120 can have a name 128, i.e., a descriptor or reference assigned typically by a programmer and included in a computer program to reference the variable 120. The variable name 128 corresponds to the variable identifier 122. For example, a variable 120 may have the identifier 0x0030 and be of size 124 100 and have the name "X." A computer program could refer to the variable name "X" which would then result in accessing a variable 120 with the corresponding identifier 0x0030 and size 100, where the identifier 122 points to or indicates the memory address 126 where the variable data is stored. In the variable maps described below and for which examples are shown in FIGS. 4-6, variables 120 are identified by identifiers 122 that correspond to named variables 120, but the variable names 128 are not included in the maps. That is, a map can identify addresses 126 of respective locations in memory 118 of variables 120 according to their respective identifiers 122.

The computer 104 may receive software updates. The software updates may be received from a remote device. A software update is a change of data or instructions stored by the computer 104. An example software update is a new set of instructions for how the computer 104 determines the location of a vehicle to which the computer 104 is attached. The computer 104 may be notified of an upcoming software update and, responsive to the notification of a software update retrieve from the memory 118 a first map 144 of the variables 120 specifying their respective locations in the memory 118 and respective sizes 124 for each of the variables 120 along with the identifiers 122.

The remote device may push new software or software updates to a plurality of computers. In the context of this document, to "push" software or a software update means to provide the software via a network to the computer 104. Typically, at a scheduled time and/or a schedule event, e.g., a vehicle reaching a non-operational, e.g., parked, propulsion-off and/or key-off state, at or after a specified time. In examples, a software update can be pushed via an over-the-air (OTA) update. Once the software update is created and before it is pushed to the computers, it can be tested using A/B testing on test computers (i.e., testing in which random variants are provided to different computers in a controlled manner to evaluate effects of the variants)/Observational data from testing the test computers can be used to update the software as warranted prior to deploying on the computers.

FIG. 3 illustrates example sets or lists 140, 142 of variables 120 used for respective first and second versions of software respectively. In this example, "version 1" variables 120 are stored in the computer 104 and used in a first version of a software application, i.e., prior to a software update. "Version 2" variables 120 are stored in the computer 104 and used in a second version of the software application, i.e., subsequent to a software update from version 1 (140) to version 2 (142). In this example, the variables 120 (named a, b, c, d, . . . ) are listed with their respective identifiers 122 and an address 126 that corresponds to their location in memory 118 and with the identifier 122 for the variables 120. The variables 120 are further listed in an order in which the variables 120 are stored in the memory 118. For variables that are more than one byte in length, the bracketed value specifies a relative byte location for the variable, e.g., a [0] is a first byte, and a [1] is a second byte, of the variable "a". Further in this example, variable "b" is of size 4 because it occupies 4 memory locations. Further in this example, in version 2 compared to version 1 variables "a" and "b" are swapped in the order of the variables 120, variable "d" is deleted, variable "c" is moved to the address 126 of former variable "d," and variable "e" is added to the end of the list.

FIG. 4 continues the example of FIG. 3 by showing along with the variable list 140 for version 1, a first map 144 for version 1, and, along with the variable list 142 for version 2, a second map 146, e.g., that could be received with a software update to update from version 1 to version 2. A variable map herein means a data set, e.g., in any suitable format such as a table or multidimensional array, that specifies, for respective variables 120 identified by an identifier 122, a memory location (i.e., an address 126) and a size 124, in a version of software. In examples herein, the first map 144 (for version 1 in the present example) may be a stored map retrieved from memory 118 by the processor 116. The second map 146 (for version 2 in the present example) may be a new or updated map received with a software update. For each map, the columns from left to right represent variable identifiers 122, memory addresses 126, and sizes 124. Each row represents an individual variable 120. FIG. 4 further includes arrows from records in the version 1 list 140 to records in the version 2 list 142. The arrows illustrate changes in the order of the variables 120, with no arrow from variable "d" in version 1 because that variable is deleted in version 2, and no arrow to variable "e" in version 2 because that variable is added.

Along with a software update, the computer 104 may receive from a remote device the second map 146 of the variables 120 specifying respective second locations in the memory 118, and second sizes 124, for the respective variables 120 along with the identifiers 122. As just explained, the second map 146 specifies variables 120 along with their respective identifiers 122, sizes 124, and memory addresses 126. The second map 146 can be different from the first map 144 due to one or more variables 120 being added, deleted, and/or moved. The processor 116 can compare the first map 144 and the second map 146 to determine changes in the variables 120 from first version of software to a second, updated version, including changes to variable order, size 124, and/or the addition or deletion of variables 120, etc. For example, the second map 146 may specify that, whereas according to the first map 144 variables 120 having names "a" "b" and "c" were stored in the order of "a" then "b" then "c," the variables 120 after the update are stored in the order of "a" then "c" then "b." Using the same example, the second map 146 may specify that a new variable "d" has been added such that the variables 120 are now stored in the order "a" then "d" then "b" then "c."

Accordingly, and with reference to FIG. 3, the second locations of variables "a," "b," and "c" are different from their first locations. Based on the comparison, in the present example the computer 104 could determine the following: variable "b" is moved to the start of the list, variable "a" is moved to follow "b" in the list i.e. moved to address 0x04, variable "d" is deleted, variable "c" is moved to the former address 126 of variable "d," and variable "e" is added at the end of the list starting at address 0x07. The computer 104 may then overwrite the first map 144 with the second map 146 and store the variables 120 as specified by the second map 146. Thus, the second map 146 shows second locations and second sizes 124 for the variables 120. It is possible that none of the locations or sizes 124 of the variables 120 change during an update. It is further possible that at least one of the second locations is the same as one of the first locations and/or at least one of the second sizes 124 is the same as one of the first sizes 124 with at least one of the first locations and/or first sizes 124 being different from the second locations and/or second sizes 124. As mentioned above, the second map 146 may be generated by the remote device that provides the software update to the computer 104. Hence, the plurality of variables 120 may be stored in the remote device in addition to being stored in the computer 104. That is, the variable names 128, locations, identifiers 122, and sizes 124 may be stored in a memory at the remote device to be used to generate the second map 146 for the software update.

Once the computer 104 has received the second map 146, to begin the software update, the computer 104 may make a comparison between the first and second map 144, 146. The comparison may take place before any of the changes included in the software update have been carried out such that all variables 120 may be updated before any other processes are updated. Based on the comparison, the computer 104 may store the variables 120 to the respective second locations in memory 118, assign the second size 124 to the variables 120, edit the value of the variable 120, and/or change the name 128 of the variable 120. As mentioned above, the second locations and/or second sizes 124 may be the same as the first locations and/or first sizes 124 or may be different depending on the software update and associated second map 146.

The computer 104 may erase and/or overwrite all or some data for variables 120 in memory 118, and/or could retain in the memory 118 data that is not changed according to comparing the first and second maps 144, 146. That is, if a variable 120 has the same value, size 124, and location in memory 118 in the first map 144 and the second map 146, the values associated with it need not be deleted, edited or updated by the computer 104 during a software update, and typically it will be desired to retain values of these variables 120 in the memory 118. Where the comparison of the first map 144 and the second map 146 indicates changes to the variables 120, only those values, sizes 124, and/or memory addresses 126 that are changed can be overwritten or changed by the computer 104. In this way, processing efficiency is enhanced by the computer 104 not needing to erase and rewrite all data and instead only editing data that is changed between the first map 144 and the second map 146.

Continuing the example of FIGS. 3 and 4, FIG. 5 illustrates the lists of variables 120 shown in FIGS. 3 and 4 along with a list of offsets 130 to be applied to the variables 120 as per a software update. To "offset" a memory address 126 of a variable herein means to adjust or move a variable's location (i.e., address 126) in memory 118 from a current location to a new location by an amount of bytes; typically the amount of bytes corresponds to a size 124 of a new value (or a sum of sizes 124 of new variables) to be added at the current location of the variable whose address 126 is being adjusted, i.e., offset. As shown in FIG. 5, and continuing with the example version 1 and 2 lists 140, 142 shown in FIGS. 3 and 4, if the first map 144 indicates that the order of variables 120 is "a" then "b" then "d," then "c," and the second map 146 indicates that the order is "b" then "a" then "c," then new variable "e," the computer 104 may update the addresses 126 of "a," "b," and "c" in memory 118 to conform to the second map 146 and apply an offset 130 to the variable 120. For example, the computer processor 116 may be further programmed to determine at least one of the addresses 126 by determining an offset 130 from a memory location of another one of the addresses 126. In this example, "a" receives an adjustment of 4, i.e., is now stored at a memory address 126 offset 130 positively by 4 bytes from its version 1 memory address 126. Thus, "a" is now stored at memory address 0x04. As illustrated in FIG. 5, "a" is adjusted with an offset of 4 to re-order variables 120 so that "a" is after or subsequent to variable "b" in memory addresses 126 used by the software application and included in the variable list for version 2, thereby making "b" the first variable in the list. Accordingly, "b" is adjusted with an offset of negative 2 to store it at address 0x00 instead of 0x02. Variable "d" is deleted from the list of variables 120 by the processor 116. Variable "c" accordingly, is adjusted with an offset of negative 1 to be stored at memory address 0x06. Further, variable "e" is adjusted with an offset of negative 1 to reference the offset to the previous end of the table.

After the comparison has been made between the first map 144 and the second map 146 and any changes indicated by the comparison have been made, the computer 104 may store the second map 146 in place of the first map 144. In this way, the second map 146 can be later used by the computer 104 to perform as the first map 144 when a yet further software update is received. As an example, the computer 104 could receive a first update and the second map 146. A comparison of the first map 144 and the second map 146 can then be made by the computer 104 and variables 120 updated as described above based on the comparison. The first map 144 could then be removed from memory 118 and the second map 146 stored in its place. Later, a further software update could be received with a further map. The second map 146 (now in the place of the first map 144) and the further map (now serving as the second map 146 described above) could then compared be and variables 120 updated.

FIG. 6 illustrates the first map 144 shown in FIG. 4 represented as a compressed map 132. A "compressed map" herein means a variable map that implicitly stores data in the map for at least some variables 120 so as to occupy less space in memory 118 than an uncompressed maps, i.e., a value of an implicitly stored datum can be inferred from explicitly presented data, possibly including an order or explicitly presented data. In the present example, variable sizes 124 for respective individual variables 120 are implicitly stored data. Instead, as will now be explained, the compressed map 132 stores data about the sizes 124 of all variables 120 in the map in a way such that the sizes 124 of individual respective variables 120 can be determined. As illustrated in FIG. 6, in the compressed map 132, the processor 116 may, according to the second map 146, represent identifiers 122 of the variables 120 in an order determined by their respective sizes 124. Here, the first map 144 shows the variables 120 in the order of "a," then "b," then "d," then "c." The compressed map 132 shows the variables 120 re-ordered by size 124 such that the order of variables is "c, d, b, a."

The processor 116 may be further programmed to compress the map to identify, for each of a plurality of sizes 124, a count 138 of the variables 120 of the respective size 124, and a starting memory address 126 for the size 124. For example, the variables 120 may be initially stored in locations in order by when they were added to memory 118. Variables' 120 storage locations in memory 118 may be re-ordered, for example, such that the variables 120 with the smallest variable sizes 124 are listed in earlier memory locations and the variables 120 with the largest variable sizes 124 are listed in later locations in memory 118. To facilitate this reordering, the processor 116 may compress the map to indicate how many variables 120 are of respective sizes 124. FIG. 6 shows an example where there is 1 variable of size 4 (variable a), 1 variable of size 2 (variable b) and 2 variables of size 1 (variables c and d). The compressed map 132 may begin a map by indicating how many different sizes 124 are represented in the map, i.e., the memory 118 includes 1 variable of size 4, 1 variable of size 2, and 2 variables of size 1. Thus, the compressed map 132 indicates that there are 3 sizes 134. Additionally, the compressed map 132 may include the identifier 122 of the variables 120 listed in order of size 124 as mentioned above such that, using the compressed map 132, the size 124 of each variable 120 can be determined by determining the position of the identifier 122 in the compressed map 132. The number of sizes 134, i.e. 3 in the present example; the list of sizes 134, i.e., 1, 2, and 4 in the present example; and the count 138 of each size 124, i.e., 2, 1, and 1, in the present example, are listed before the list of variable identifiers 122 so that the processor 116 may read them first and thereby determine the size 124 of the variables 120 in the list as described below. For example, the processor 116 may determine the size 124 of variable "a" by reading the compressed map 132. There are three variable sizes 124 represented in the compressed map 132 of FIG. 6. The sizes 124 are 1, 2, and 4. There are two variables of size 1, one variable of size 2, and one variable of size 4. Therefore, when the processor 116 has read through the list of variables 120 and reached variable "a," it can determine that, because "a" is the 3rd variable in the list, it has a size of 1.

The processor 116 may be further programmed to determine the size 124 of the plurality of variables 120 based on a comparison of the respective one variable's relative location in memory 118 to the compressed map 132. That is, memory 118 can be saved by deleting the variable size 124 listed in the records with each variable identifier 122. To determine the size 124 of a variable 120, the compressed map 132 may begin by listing the variable sizes 124. That is, the computer 104 may read through the listings of the variables sizes 124 at the start of the compressed map 132 in order to know the size 124 of a specific variable in the compressed map 132. As an example, if the variable size 124 listings in the beginning of the compressed map 132 indicate that there are 4 different sizes 124; that those 4 sizes are 1, 4, 20, and 100; and that the count 138 of each respective size is 4, 6, 2, 1; the computer 104 may determine the size 124 of a variable 120 associated with a variable identifier 122 based on the size 124 listings. Expanding on the present example, the computer 104 may be seeking the size 124 of the 8$^{th}$ identifier listed. To find the size 124, the processor 116 analyzes the size 124 listings of the compressed map 132: there are 4 sizes 124. The first size 124 is 1 and there are 4 variables of that size 124. The second size 124 is 4 and there are 6 variables of that size 124. Therefore, if the variables 120 are ordered by size 124, then the 8$^{th}$ identifier would have a size of 4. The processor 116 reads the compressed map 132 down to the 8$^{th}$ identifier.

Example Processes

FIG. 7 shows a process flow diagram of an example process 700 for storing data in an electronically erasable programmable read-only memory (EEPROM). The process can be carried out according to program instructions executed by the computer 104.

The process 700 begins in a decision block 705 wherein the computer 104 determines whether a software update has been received from a remote device. As described above, the software update includes a second map 146. Therefore, when the computer 104 has received a software update which may change variables 120, the computer 104 also receives a second map 146. If no software update has been received, the process continues to block 735. Otherwise, the process continues to block 710.

In block 710, the computer 104 retrieves a stored map that may be referred to as a first map 144 as described above.

Next, in decision block 715, the computer 104 compares the first map 144 to the second map 146 to determine whether the order of the variables 120 has changed. For the order of the variables 120 to be changed, some or all of the memory addresses 126 of the variables 120 may need to be changed as described above. For example, the first map 144 may indicate that the order of variables is "A, B, C." However, the second map 146 may indicate that the new order of the variables is "A, C, B." The second map 146 may also indicate that new variables have been added or existing variables have been removed by the software update, which would change the memory address 126 of other variables due to variables 120 needing to be offset to accommodate the vacant space or added space. If none of the memory addresses 126 of the variables 120 have changed from the first map 144 to the second map 146, the process continues to block 720. Otherwise, the process continues to block 725.

In block 720, the computer 104 has determined that the order of at least some variables 120 has changed and applies an offset 130 to the memory addresses 126 of the variables 120 to reflect the second map 146. As described above, to offset the memory addresses 126 refers to adjust a value in memory 118 by an amount of bytes to accommodate a new value. Therefore, to offset a memory address 126 could mean to create new space for a variable 120 that has been added according to the second map 146 or could mean to re-arrange the order of existing variables 120. As described above, memory addresses 126 may be changed as a result of variables 120 being re-arranged in the order of listing, new variables being added, or existing variables 120 being removed. As an example, the first map 144 may indicate that three variables are stored in the order of "A, B, C" and A is stored at memory address 1, which would mean that "B" is stored at address 2 and "C" is stored at address 3. However, the second map 146 indicates that the new order is "A, C, B." Therefore, the computer 104 applies an offset 130 to the memory addresses 126 to accommodate the change by decreasing the memory address 126 of "C" by 1 and increasing the memory address 126 of "B" by 1. Further examples are provided above.

Next, in block 725, the computer 104 stores the variables 120 to the second locations indicated by the second map 146. The computer 104 has previously either determined that no memory addresses 126 need to receive an offset 130 or has already applied an offset 130 to the memory addresses 126. Regardless, the variables 120 are stored in the order indicated by the second map 146, their addresses 126 being unchanged or offset as per block 720.

Next, in block 730, the computer 104 stores the second map 146 as described above. That is, the computer 104 overwrites the first map 144 with the second map 146 in memory 118. This step may include storing the second sizes 124 of the variables 120, storing new values of the variables 120, etc. The sizes 124 of the variables 120 are described above. Sizes 124 refer to the length of bytes necessary to store the value of the variable 120. The sizes 124 of the variables 120 may be unchanged in the second map 146 or changed to require more or less bytes. Where the second map 146 indicates that the software updates change the sizes 124 of at least some variables 120, the sizes 124 of such variables 120 are changed in memory 118. However, where the size 124 of a variable 120 is not changed from the first map 144 to the second map 146, the same size 124 will be stored for the variable 120. The storing of the second map 146 in place of the first map 144 allows the second map 146 to be used to perform the function of the first map 144 in a subsequent software update. That is, in a subsequent update, the computer 104 will retrieve the second map 146 from memory 118 to be compared with a further map received in the subsequent update.

Next, in block 735, the computer 104 determines whether to continue the process. Typically, the process continues to monitor for received software updates and therefore returns to block 705. However, the process may be ended by the deactivation of the computer 104 or the decommissioning of the software which receives the updates in block 705. Additionally, the computer 104 may receive a software update providing instructions to the computer 104 not to monitor for software updates any longer.

Computing devices such as those discussed herein generally each includes commands executable by one or more computing devices such as those identified above, and for carrying out blocks or steps of processes described above. For example, process blocks discussed above may be embodied as computer executable commands.

Computer executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor 116 (i.e., a microprocessor) receives commands, i.e., from a memory 118, a computer readable medium, etc., and executes these commands, thereby performing one or more processes, including one or more of the processes described herein. Such commands and other data may be stored in files and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer 104 (i.e., by a processor 116 of a computer 104). Such a medium may take many forms, including, but not limited to, non-volatile media and volatile media. Instructions may be transmitted by one or more transmission media, including fiber optics, wires, wireless communication, including the internals that comprise a system bus coupled to a processor 116 of a computer 104 104. Common forms of computer-readable media include, for example, RAM, a PROM, an EPROM, a FLASH-EEPROM, any other memory chip or cartridge, or any other medium from which a computer 104 can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Use of in response to, based on, and upon determining herein indicates a causal relationship, not merely a temporal relationship. "Based on" or "in response to" can mean based at least partly on or at least partly in response to unless explicitly stated otherwise.

Examples are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. It will be understood that the usage of the terms "first" and "second" are merely identifying and not necessarily indicative of priority.

The invention claimed is:

1. A system, comprising a processor and a memory, the processor programmed to:
   store records at respective locations in the memory, the records respectively including, for one of a plurality of variables, an identifier and a size;
   responsive to a notification of a software update,
   retrieve from the memory a first map of the variables specifying their respective locations in the memory and respective sizes for each of the variables along with the identifiers;
   receive from a remote device a second map of the variables specifying respective second locations in the memory, and second sizes, for the respective variables along with the identifiers;
   compress the second map to identify, for each of a plurality of sizes, a count of the variables of the respective size, and a starting memory address for the size;
   store the variables to the respective second locations in memory; and
   store the second map in place of the first map.

2. The system of claim 1, wherein the processor is further programmed to identify addresses to the respective locations in the memory.

3. The system of claim 2, wherein the processor is further programmed to determine at least one of the addresses by determining an offset from a memory location of another one of the addresses.

4. The system of claim 1, wherein at least one of the second locations is the same as one of the first locations.

5. The system of claim 1, wherein at least one of the second sizes is the same as one of the first sizes.

6. The system of claim 1, wherein the processor is further programmed to determine the size of the plurality of variables based on a comparison of the respective one variable's relative location in memory to compressed map.

7. The system of claim 1, wherein the respective locations in the memory are organized by an order in which the variables were stored in memory.

8. The system of claim 1, wherein the respective locations in the memory are organized by the respective sizes.

9. The system of claim 1, wherein the plurality of variables are stored in the remote device.

10. A method comprising:
    storing records at respective locations in a memory, the records respectively including, for one of a plurality of variables, an identifier and a size;
    responsive to a notification of a software update,
    retrieving from the memory a first map of the variables specifying their respective locations in the memory and respective sizes for each of the variables along with the identifiers;
    receiving from a remote device a second map of the variables specifying respective second locations in the memory, and second sizes, for the respective variables along with the identifiers;
    compressing the second map to identify, for each of a plurality of sizes, a count of the variables of the respective size, and a starting memory address for the size;
    storing the variables to the respective second locations in memory; and
    storing the second map in place of the first map.

11. The method of claim 10, further comprising identifying addresses to the respective locations in the memory.

12. The method of claim 11, further comprising determining at least one of the addresses by determining an offset from a memory location of another one of the addresses.

13. The method of claim 10, wherein at least one of the second locations is the same as one of the first locations.

14. The method of claim 10, wherein at least one of the second sizes is the same as one of the first sizes.

15. The method of claim 10, further comprising determining the size of the plurality of variables based on a comparison of the respective one variable's relative location in memory to compressed map.

16. The method of claim 10, wherein the respective locations in the memory are organized by an order in which the variables were stored in memory.

17. The method of claim 10, wherein the respective locations in the memory are organized by the respective sizes.

18. The method of claim 10, wherein the plurality of variables are stored in the remote device.

\* \* \* \* \*